UNITED STATES PATENT OFFICE.

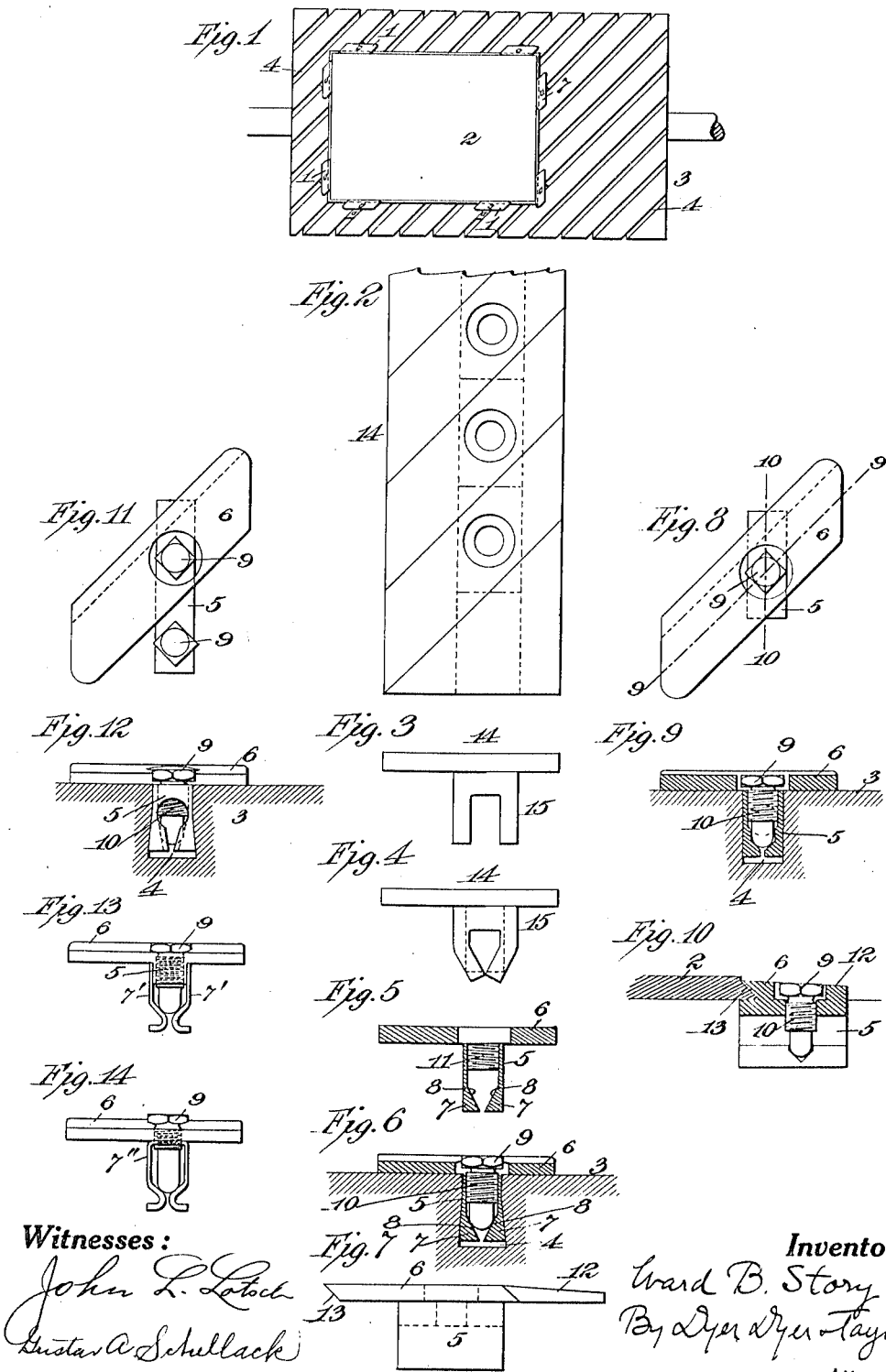

WARD B. STORY, OF NEW YORK, N. Y.

END AND SIDE CLIP.

1,078,966.  Specification of Letters Patent.  Patented Nov. 18, 1913.

Application filed January 20, 1912. Serial No. 672,376.

*To all whom it may concern:*

Be it known that I, WARD B. STORY, a citizen of the United States, residing in the borough of Brooklyn, county of Kings, city and State of New York, have invented a certain new and useful End and Side Clip, of which the following is a specification.

This invention relates to clips, more particularly adapted for use in holding plates upon the cylinders or beds of printing presses.

My object is to produce a clip which can be cheaply made, formed of few parts, easily and readily adjusted, and when adjusted will be immovable, and possessing great strength. These and further objects will more fully appear from the following specification and accompanying drawings, considered together or separately, in which—

Figure 1 is a plan view of a cylinder of a printing press and a plate, showing in use a number of clips embodying my invention. Fig. 2 is a plan view of a portion of the stock from which a number of clips may be made, said clips embodying the preferred form my invention. Fig 3 is an end view of Fig. 2. Fig. 4 is a view similar to Fig. 3, after a portion of the batten of the stock has been distorted, carrying out one of the steps of the process of manufacture of the clip. Fig. 5 is a cross-section of the completed clip, without the expanding bolt. Fig. 6 is a similar view, showing the clip secured within a groove of the cylinder or bed, and showing the expanded bolt in place. Fig. 7 is an end view of the clip shown in Fig. 6. Fig. 8 is a plan view of the completed clip, slightly different from that illustrated in Figs. 5, 6 and 7. Fig. 9 is a section of the clip shown in Fig. 8, taken on the line 9—9 of Fig. 8. Fig. 10 is a cross-section of the same clip, taken on the line 10—10 of Fig. 8, and also showing a portion of the plate. Fig. 11 is a plan view of a modified form of clip showing a plurality of expanding bolts. Fig. 12 is an elevation of the same, showing the stem within the groove in the cylinder or bed plate of the press. Figs. 13 and 14 are detail views of further modifications.

In all of the views, like parts are designated by the same reference characters.

Fig. 1 shows a number of clips 1, 1, 1, holding the plate 2 upon the cylinder 3.
The same form of clips are used for attaching plates to a flat bed. The bed or cylinder is provided with the usual diagonal grooves 4. These grooves may have parallel sided walls shown in Fig. 9, or they may be undercut or dovetailed, as shown in Figs. 6 and 12. Each clip is formed with a stem 5, which lies within the groove 4 and a head 6, which rests upon the face of the cylinder or bed. This head engages with the edge of the plate 2 and holds it in position. Referring more particularly to Figs. 5 and 6, it will be seen that each stem is formed of two limbs 7, 7. Each limb is provided with an inclined surface 8. A bolt 9 engages with this inclined surface, and by being screwed in place, will expand or separate the limbs engaging them with the walls of the groove 4. The bolts are provided with threads 10, which engage within threads in an opening 11 formed in the stem (see Fig. 5). The bolts are provided with the non-circular head as shown, or any other turning head, by means of which they may be rotated by means of a suitable tool. The top of the head 6 is beveled at 12, so that the inked form rollers will not come in contact with the clip. The edge of the head which engages with the plate is inclined at 13, so as to engage with a similarly inclined edge of the plate for holding it in position against the cylinder or bed.

In forming the preferred form of clip, I employ stock, which is in the form of a flat strip 14 having a grooved batten 15 at one side. The sides of the batten are bent inwardly, as shown in Fig. 4. The inner sides form inclines, as shown. The material of the outer sides and bottom of the batten is then removed along the dotted line shown in Fig. 4, so that the cross-section of the stock is of the shape shown in Fig. 5. The flat strip is then cut diagonally, as shown in Fig. 2, to form the heads of a number of clips, and the batten is cut at right angles, as shown in dotted lines in Fig. 2, so as to form the stems. The beveling and inclining of the head and rounding of the corners may then be made. The clip is then finished, making the hole 11 as shown in Fig. 5, screw-threading the latter, and attaching the bolt. This hole may be made, and tapped before the stock is cut apart to form the individual clips. By making the clip in the manner described, the limbs 7 of the stem can be made thin and relatively flexible at their upper portion and will have the desirable inclined portion at their bottom part.

This form of clip may be cheaply made, and employs stock which can be manipulated to final form with a minimum amount of loss.

The embodiment of the invention illustrated in Figs. 8 to 10 inclusive, is very similar to that described, except that the stem of the clip is shown as formed originally of stock of the outside configuration of the finished clip. The hole through which the bolt passes extends downward. This hole is made with a drill which leaves an inclined seat as shown.

The clip shown in Figs. 11 and 12 differs from that described, in having an inclined opening through the stem, for engagement with the end of the bolt. It also has a longer stem and is provided with a plurality of bolts as shown. Such form of clip is illustrated as engaging with the lower edge of the plate in Fig. 1. It gives a more firm grip upon the groove of the cylinder and is desirable, for this reason, for use in holding the rear edge of the plate in position.

In Fig. 13 I have shown a form of clip in which the stem 6 is made shorter and the limbs 7' are secured thereto by brazing or otherwise.

The modification shown in Fig. 14 illustrates a form of my invention in which the limbs 7'' are formed of a U-shaped piece of spring metal secured directly to the under side of the head, and the threads for the screws are in the head.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is—

1. An end and side clip having a head, and a stem, said stem being formed of limbs integrally formed with the head, and a bolt which engages directly with the limbs and forces them apart.

2. An end and side clip having a head, and a stem, said stem being formed of limbs integrally formed with the head, said limbs having inclined inner surfaces and a bolt engaging directly with said inclined surfaces.

3. A side and end clip having a flat head adapted to lie against the bed and engage with the plate, and a threaded stem, said stem having limbs, inclined surfaces on the inside of the limbs, a hole through the head, and a bolt engaging with the hole and the threaded stem, also with the inclined surfaces.

4. A side and end clip having a flat head, an integral stem, said stem lying at an angle to the head, integral limbs on the stem, and a plurality of expanding bolts engaging with the limbs.

This specification signed and witnessed this 8th day of January, 1912.

WARD B. STORY.

Witnesses:
JAS. F. COLEMAN,
JOHN L. LOTSCH.